Patented July 11, 1944

2,353,193

UNITED STATES PATENT OFFICE 2,353,193

RECOVERY OF METALLIC MAGNESIUM

Royd R. Sayers, Alexandria, Va., assignor to the United States of America, as represented by the Secretary of the Interior No Drawing. Application March 26, 1942,
Serial No. 436,251

1 Claim. (Cl. 75—67)

(Granted under the act of March 3, 1883, as amended April 30, 1928; 370 O. G. 757)

The invention described herein may be made and used by and for the Government of the United States without payment to me of any royalty therefor.

This invention relates to processes for the production of metallic magnesium, and aims generally to improve the same.

The invention relates particularly, but not exclusively, to electrothermal processes for the production of magnesium where the magnesium is produced in the vapor state by the reduction of its oxide at high temperatures. Since such processes are usually carried out by reducing the magnesium oxide with carbon or with compounds containing carbon, then magnesium vapor is produced in admixture with oxides of carbon and the reaction tends to reverse with the formation of carbon and magnesium oxide as the temperature falls. In the known art this reversal is in part inhibited by chilling the mixture of magnesium vapor and oxides of carbon with hydrogen or a hydrocarbon gas.

The use of hydrogen in this manner is objectionable because of its highly explosive nature. It is also objectionable because it may react with the oxides of carbon or with other oxides which may be present in the gaseous mixture, and produce water vapor. This water vapor is even more effective in reoxidizing magnesium when the temperature is lowered than are the oxides of carbon. This arises in part from the fact that when small particles of magnesium react with oxides of carbon, they become coated with carbon and are protected from further oxidation, while when they react with water vapor, only a permeable coating of magnesium oxide is formed and the particle may be entirely oxidized. By the addition of hydrocarbon gases, this coating of the particles with carbon is increased. The result, however, is that there is obtained as a product of the reduction of magnesium oxide with carbon and its condensation by methods known in the art, a practically colloidal mixture of magnesium carbon and magnesium oxide. To obtain pure magnesium in a coherent state from such a mixture, a further distillation process is necessary.

It has been the aim of many investigators working on the electrothermic processes for the preparation of magnesium to condense the magnesium in the first instance in a coherent, preferably liquid form. My invention permits the accomplishment of this highly desirable result.

I have found that when pure helium is used as the condensing agent, magnesium vapor may be condensed to particles of liquid having a sufficiently clean surface so that they may be coalesced to form a coherent mass of metal. In certain instances, it may be desirable to cool sufficiently so that solid particles of magnesium are obtained, but under the conditions which I preferably employ, these solid particles are agglomerated to have sufficient size so that they may be mechanically separated from any carbon or other impurities. By conjointly subjecting the mixture of magnesium vapor and oxides of carbon to condensing and agglomerating treatment, the liquescent magnesium which by simple condensation would be obtained in a fog-like state of particle size is, concurrently with its derivation from the vapor phase, resolved to a state comprising enlarged liquid particles presenting reduced exposed surface area. This reduction of free surface by my invention before substantial reoxidation can occur reduces the area of contact between the magnesium and oxides of carbon and thus further obviates reoxidation of the magnesium.

Thus my invention resides essentially in the use of helium as a condensing agent for magnesium in vapor phase. However, to obtain the full benefits of my preferred embodiment, the condensing system is preferably so arranged that the liquid or solid particles of magnesium metal are impinged upon each other or upon a surface of liquid magnesium.

To accomplish this purpose, any suitable mechanism may be employed. Such mechanisms as have been devised for the agglomeration of fume particles in general by mechanical means may be used. The cyclone type of dust collector may be incorporated to form a condenser for the practice of my invention. Alternatively, I have found that the use of supersonic waves may be advantageously employed to agglomerate the particles of liquid or solid magnesium which are formed when practicing my invention.

The helium which is used in the large scale practice of my invention will, preferably, be repurified and recirculated. Methods for accomplishing this are known in the art.

As an example, I may mix the used helium contaminated with carbon monoxide with the required amount of oxygen and pass the mixture over heated copper oxide. The carbon monoxide is thereby converted entirely to carbon dioxide. This may be conveniently removed by passing through a tower containing sodium hydroxide. Helium purified in this way will contain only a small amount of nitrogen which may have leaked into the equipment. Such nitrogen will be taken up by the magnesium and will be removed in the final melting and dressing operation which is required to put the magnesium in shape for market.

I claim:

The process of condensing magnesium metal from a mixture of magnesium vapor and oxides of carbon produced at high temperatures which comprises introducing helium into such mixture at a temperature below the temperature of the mixture but above the melting temperature of the magnesium, and subjecting the resulting mixture including the helium and the condensing magnesium particles to a supersonic wave, propagated through a medium comprising the said mixture, whereby to cause an agglomeration of liquescent magnesium particles and the production of metallic constituents comprising relatively large metallic agglomerates.

R. R. SAYERS.